United States Patent

Yasue et al.

[11] 3,856,167
[45] Dec. 24, 1974

[54] SPARE WHEEL HOLDING DEVICE

[75] Inventors: Setsuo Yasue, Gifu-ken; Tomio Yamamoto, Aichi-ken, both of Japan

[73] Assignee: Sank Kiki Kabushiki Kaisha, Nageipa, Japan

[22] Filed: Jan. 2, 1973

[21] Appl. No.: 320,534

[30] Foreign Application Priority Data
Dec. 30, 1971  Japan.................................. 47-2262

[52] U.S. Cl............................. 214/451, 224/42.23
[51] Int. Cl............................................ B62d 43/04
[58] Field of Search ......... 214/451, 454; 224/42.21, 224/42.23, 42.24

[56] References Cited
UNITED STATES PATENTS

| | | | |
|---|---|---|---|
| 2,661,130 | 12/1953 | Evans | 224/42.21 |
| 2,775,358 | 12/1956 | Renouf | 214/451 |
| 2,823,069 | 2/1958 | Walker | 214/451 |
| 3,395,819 | 8/1968 | Fruetel | 224/42.23 |
| 3,539,152 | 11/1970 | Paul | 224/42.23 |
| 3,542,413 | 11/1970 | Hardison | 214/451 |
| 3,554,397 | 1/1971 | Cluff | 214/451 |

*Primary Examiner*—Robert J. Spar
*Assistant Examiner*—John Mannix

[57] ABSTRACT

An improved device for holding a spare wheel on a motor vehicle which includes a spare wheel support member suspended from a chain or rope passed around a winch mechanism, and provided with a groove or hole, and an elongate stopper member engageable with the groove or hole of the spare wheel support member, so that the chain or rope holds the spare wheel support member in its raised position when the chain is tightened to keep the spare wheel from falling.

8 Claims, 15 Drawing Figures

(b)

(a)

(b)

1

SPARE WHEEL HOLDING DEVICE

BACKGROUND OF THE INVENTION

This invention relates to improvements in a device for holding a spare wheel for a motor vehicle, especially a heavy truck wheel, under its chasis.

The spare wheel holding device known in the prior art comprises a chain, a hanger plate fastened to the lower end of the chain for hanging a spare wheel from the chain, and a winch mechanism having a large reduction ratio and housed in a casing secured to the underside of the chassis of a motor vehicle for hauling up the chain to raise the wheel to a position under the chassis. To keep the wheel from falling due to the vibration or jolting of the vehicle while it is in use, which may cause reverse operation of the winch mechanism, it has been necessary to hold the wheel in its raised position by means of a second chain or a band bolted or otherwise secured at both ends to a frame member porvided on the underside of the chassis for mounting the winch casing. Use of the spare wheel has been troublesome and made all the more difficult because of the relatively cramped space between the chassis and the ground.

This invention has been made with these problems in mind. A feature of this invention lies in the provision of positive means for preventing a spare wheel from falling from its raised position adjacent to the underside of the chassis of a motor vehicle as a result of the vibration and jolting of the vehicle which has in the past caused reverse operation of winch mechanisms holding up the spare tire. This means comprises a stopper provided in a casing for the winch mechanism, which stopper is engageable with a peripheral groove formed on the wheel support member adapted to protrude into the winch casing when the wheel is raised to its position under the vehicle chassis, so that the sopper prevents the wheel support member from falling our of the winch casing unintentionally due to the vibration or jolting of the vehicle. Thus, this invention provides an improved spare wheel holding device which is simple and easy to use without requiring extra chain or band required by the older and known devices for holding the spare wheel in position under the chassis of a motor vehicle.

DESCRIPTION OF THE DRAWINGS

The foregoing and other objects and features of this invention will become more apparent from the following description, and the accompanying drawings, in which:

FIG. 5(a) and FIG. 5(b) together show a stopper lever and a wheel support member, and illustrate how the lever cooperates with the wheel support member to hold a spare wheel in position;

DESCRIPTION OF THE PREFERRED EMBODIMENTS

Figure 1:
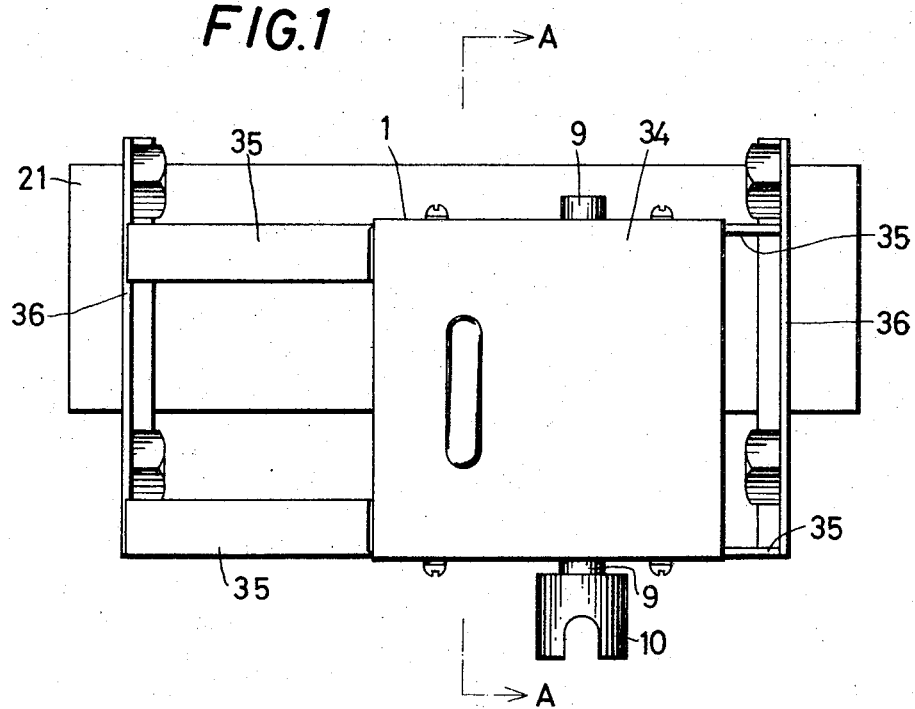
FIG. 1 is a plan view of a preferred embodiment of this invention.

Referring now more particularly to FIGS. 1 through 8 showing a first preferred embodiment of this invention, the spare wheel holding device comprises a casing 1 (FIG. 2) in which there are provided a chain wheel 2 and a worm gear 3 which are integrally formed with each other in coaxial arrangement. The chain wheel 2 has a boss 2a which is rotatably supported in a bearing member 30 secured to the inner surface of one side wall of the casing 1, while the worm gear 3 is provided with a boss 3a which is rotatably supported in a bent bearing member 31 secured to the opposite side wall of the casing 1. A wom 4 engages the worm gear 3, and has a pair of oppositely disposed bosses 4a and 4b (see FIG. 4) which are rotatably supported respectively in a pair of bearing plates 32 and 33 in the lower part of the casing 1. The worm 4 is positioned at right angles to the worm wheel 3, and supported for rotation on the bearing plates 32 and 33.

A ratchet wheel 5 is fitted around the boss 4a protruding beyond the bearing plate 32. A cam 6 encircles the end of the boss 4a. The cam 6 is formed with a pair of angular grooves 7 located symmetrically relative to its axis and having a gradually increasing offset along the axis of the circular cam 6. The worm 4 is provided with an axial bore 8. An operating shaft 9 is loosely inserted through the axial bore 8 at one end, and through one side wall of the casing 1 at the opposite end (see FIG. 4. A pin 11 extends from the operating shaft 9 at right angles and the two ends of the pin 11 are engaged with the grooves 7 which comprise the cam 6. Another pin 12 extends from the opposite end portion of the operating shaft 9. The ends of the pin 12 protrude from the diametrically opposite sides of the shaft 9 and are engageable with the abutment portion 15 of a lever 13 to be hereinafter described.

The one end of the operating shaft 9 extends through an adjacent side wall of the casing 1, and supports a member 10 for connection to an operating handle (not shown). An elongate stopper or lever 13 is located in the bottom of the casing 1, and pivotally attached to the bottom wall 27 of the casing 1 at one end by a pin 17 (see FIG. 2). The abutment portion 15 hereinabove mentioned forms a part of the lever 13 and it is positioned at right angles thereto. The abutment portion 15 has a hole 16 encircling the operating shaft 9 just beyond the boss 4b. The abutment portion 15, i.e., the lever 13, is positioned just inboard of the pin 12 on the operating shaft 9, namely, between the pin 12 and the boss 4b. The free end of the lever 13 is formed with a substantially semicircular latch portion 14 (see FIG. 3) which rests on an annular reinforcing member 29 located at the edge of a hole 28 formed in the bottom wall 27 of the casing 1 for passing a chain therethrough. Upon pivotal movement of the lever 13, the latch portion 14 thereof is moved over the hole 28 toward the rear wall of the casing 1.

Figure 3:
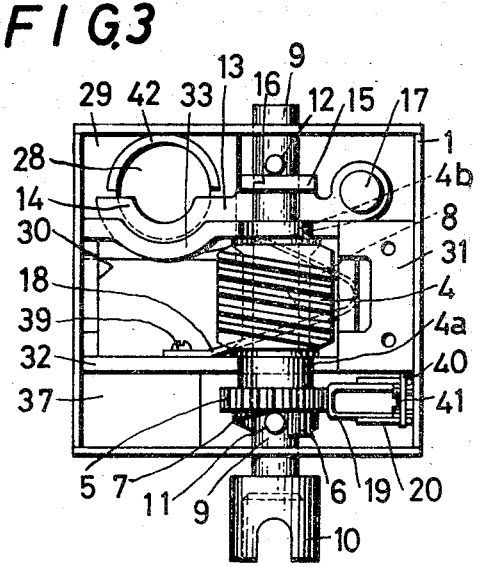
FIG. 3 is a plan view of the device shown in FIG. 1 with the top omitted.
Figure 4:
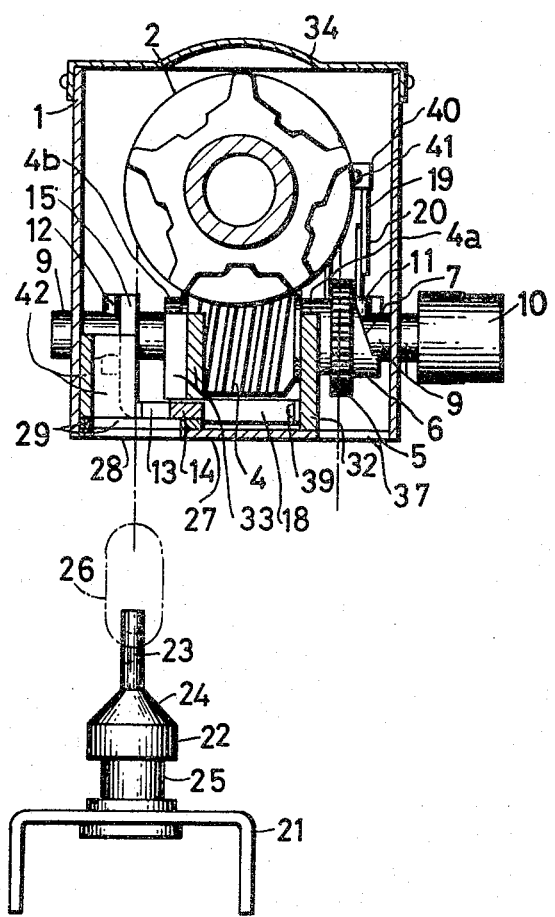
FIG. 4 is a vertical cross-sectional view taken along the line A—A of FIG. 1.

As shown in FIG. 4, a curved leaf spring 18 is secured at one end to the inner side of the front bearing plate 32 adjacent to the lower edge thereof, and the opposite end of the spring 18 is pressed against the facing edge or side of the lever 13. As shown in FIG. 3, the spring 18 urges the lever 13 toward the back of the casing 1, thereby keeping the abutment portion 15 of the lever 13 in contact with the pin 12 on the operating shaft 9 and urging the operating shaft 9 backward, while the pin 11 at the front end portion of the shaft 9 is maintained in engagement with the grooves 7 of the cam 6. The co-action of the cam 6 and the pin 11 converts rotation of the operating shaft 9 into a sliding movement of the shaft 9. The pin 12 reciprocates relative to the rear wall of the casing 1 to thereby cause pivotal movement of the lever 13, hence movement of the latch portion 14 relative to the hole 28 in the bottom wall 27 of the casing 1.

A generally U-shaped resilient pawl member 19 which is preferably made of spring steel wire is secured at its free ends to the inner surface of the right-hand (as viewed in FIG. 2) side wall of the casing 1, and extends toward the ratchet wheel 5. Each of the two dependent parallel portions of the pawl member 19 is provided with a round loop 20 intermediate the ends thereof. The closed lower end portion of the U-shaped pawl member 19 forcibly engages the peripheral edge of the ratchet wheel 5, as a result of the resilient construction of the pawl 19.

Going now to FIG. 4, a hanger plate 21 for carrying a spare wheel (not shown) therein is shown suspended below the casing 1. The hanger plate 21 is supported by the lower end of a vertically disposed wheel support member 22. The wheel support member 22 is formed at its upper end with a ring-shaped portion 23 which is connected to the end link of a chain 26 hanging from the chain wheel 2 and through the hole 28 in the bottom wall 27 of the casing 1. The support member 22 is enlarged at its middle portion 24 to define a groove 25 having substantial depth below its middle portion 24. The member 22 is generally cylindrical in shape.

The casing 1 is provided with a top cover 34, and supported on a bracket 35 which is connected to mounting plates 36 for attaching the casing 1 to a vehicle. The bottom wall 27 of the casing 1 has another hole 37 (FIG. 3) on the opposite side from the hole 28, and the opposite end of the chain 26 is passed through the hole 37. A plate 38 (FIG. 2) is provided on the bent bearing member 31 to hold the boss 3a of the worm wheel 3 against the bearing member 31. A screw 39 (FIG. 4) fastens the leaf spring 18 to the bearing plate 32. A washer and a pair of screws 41 are used to secure the pawl member 19 to the side wall of the casing 1. A semi-cylindrical guide member 42 stands vertically next to the rear half of the hole 28 and is diametrically opposed to the semi-circular curved portion of the rear bearing plate 33, all as shown in FIG. 3.

The device as hereinabove described is secured, when used, conveniently under the chassis of a motor vehicle, usually near the rear end thereof by any known connective device. A spare wheel (not shown) to be carried by the device is axially mounted above the hanger plate 21. In order to lift the wheel, a handle is attached to the handle fitting member 10, and turned clockwise to thereby cause the member 10, hence the operating shaft 9 to rotate clockwise. The resilient pawl member 19 prevents the ratchet wheel 5 from rotating clockwise, and the front pin 11 on the operating shaft 9 stays in the shallowest ends of the grooves 7 of the cam 6, as shown in FIG. 6(a).

During the initial stage of the clockwise rotation of the operating shaft 9, the pin 11 moves from the shallowest to the deepest ends of the cam grooves 7 in the direction of the arrow shown in FIG. 6(a), while the operating shaft 9 continues to rotate without causing the worm 4 to rotate. Since the operating shaft 9 is urged backward by the leaf spring 18 pressing the abutment portion 15 of the lever 13 against the rear pin 12 on the shaft 9, the front pin 11 stays in contact with the bottom of the cam grooves 7 throughout its movement along the grooves 7 toward the deepest ends thereof, and accordingly, the operating shaft 9 is forced backward while it is rotated. Simultaneously with the backward movement of the operating shaft 9, the lever 13 turns about the pin 17, and its curved end portion 14 is moved backward.

When the pin 11 reaches the deepest ends of the cam grooves 7, the operating shaft 9 stops moving backward, and accordingly, the lever 13 stops its rotation with its curved end portion 14 protruding over the adjacent edge of the hole 28 in the bottom wall 27 of the casing 1. This position is achieved at the end of rotation of the operating shaft 9 but before the worm 4 is rotated. The operating shaft 9 is now operationally associated with the worm 4 through the cam 6, the ratchet wheel 5 and the boss 4a, so that they rotate together. The operating shaft 9 is further rotated clockwise and the cam 6 is rotated by the pin 11 so that the ratchet wheel 5, the boss 4a and the worm 4 all rotate as a unit.

Figure 2:
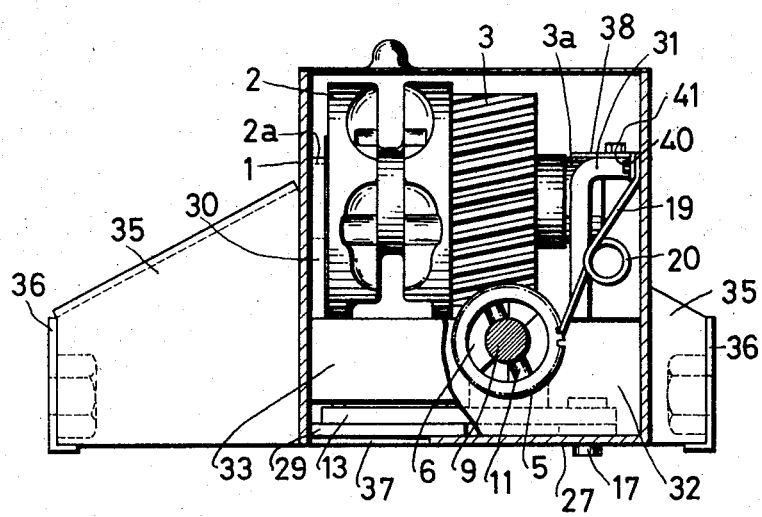
FIG. 2 is a view, partly broken away, of the front elevation of the device shown in FIG. 1.
Figure 6:
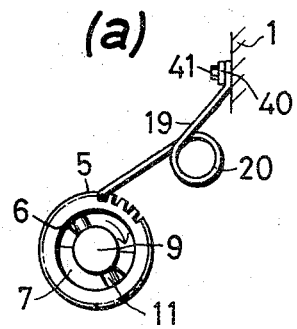
FIG. 6(a) and FIG. 6(b) show a resilient pawl member in different operation positions.
Figure 6:
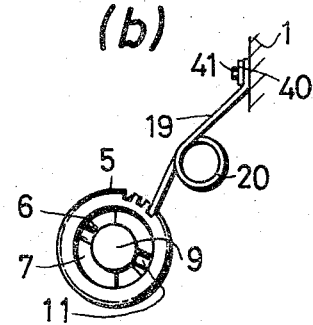
Figure 7:
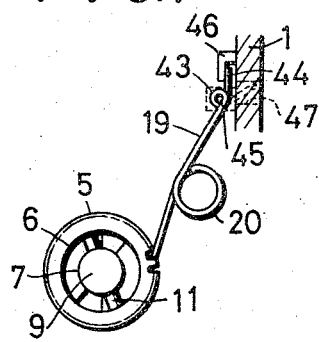
FIG. 7 is a front elevational view of another form of the resilient pawl member.

Although before the initial rotation the resilient pawl member 19 is engaged with the ratchet wheel 5 in such a position as to prevent rotation of the ratchet wheel 5 clockwise as shown in FIG. 6(a), the additional force applied to the handle to continue rotating the operating shaft 9 causes the ratchet wheel 5 to rotate clockwise and overcome the resistance of the pawl member 19 as the resilient pawl member 19 deflects and deforms at its loops 20, and shifts from its position shown in FIG. 6(a), through the position in FIG. 6(b) and finally to the position of FIGS. 2 or 7. The resilient pawl member 19 moves with a "snap action" by deflection and deformation to a position then preventing counterclockwise rotation.

Figure 5A:
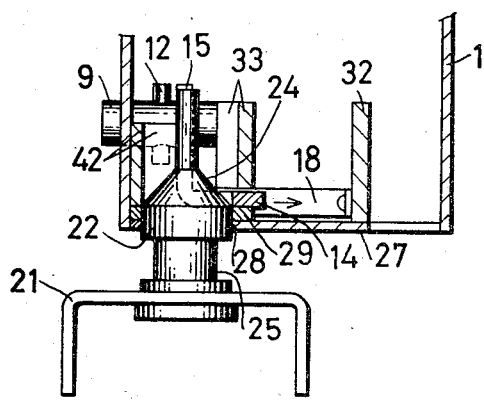
Figure 5A:
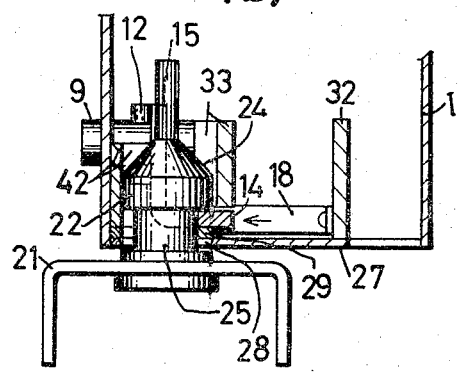

As the worm 4 is rotated clockwise, the worm wheel 3 engaged with the worm 4 rotates clockwise at a reduced rate, so that the chain wheel 2 connected to the worm wheel 3 also rotates clockwise at the same speed. As the chain wheel 2 is rotated clockwise, the chain 26 is hauled up. The spare wheel carried on the hanger plate 21 is then lifted. As the chain 26 is hauled up, the ring 23 of the wheel support member 22 moves up into the casing 1 through the opening 28 and then, the enlarged portion 24 contacts the curved latch portion 14 of the lever 13. As the chain 26 is further hauled up, the enlarged portion 24 causes the latch portion 14 to retract in the direction of the arrow shown in FIG. 5(a)

by overcoming the resistance of the leaf spring 18. Further lifting of the chain 26 positions the groove 25 over the upper edge of the latch portion 14, whereupon the leaf spring 18 pushes the latch portion 14 back to its initial position by causing the lever 13 to rotate in the direction of the arrow shown in FIG. 5(*b*). The lever 13 is then locked in the groove 25 of the wheel support member 22 as shown in FIG. 5(*b*). This is the highest position of the wheel support and the spare tire. The spare wheel is pressed against the lower surface of the bracket 35 and is not free to cant or jiggle. The chain 26 can no longer be hauled up, and the handle may be detached from the operating shaft 9 and stored.

In order to lower the wheel at any time, whether an emergency or otherwise, the handle is attached to the handle fitting member 10 and the operating shaft 9 is rotated counterclockwise. During the initial stage of the counterclockwise rotation of the operating shaft 9, the cam 6 is prevented from rotating because the pawl member 19 prevents the ratchet wheel 5 from rotating in spite of the fact that, with counterclockwise rotation of the operating shaft 9, the pin 11 presses against the inclined edges of the grooves 7 of the cam 6. Accordingly, the pin 11 is caused to slide from the deepest to the shallowest ends of the grooves 7 of the cam 6 along the edges, and the operating shaft 9 is forced toward the operator while it is being rotated counterclockwise. As the operating shaft 9 moves forward, the pin 12 at the rear end portion of the shaft 9 pushes the lever 13 forward by overcoming the resistance of the leaf spring 18 and rotates the curved end portion 14 until it is disengaged from the groove 25 of the wheel support member 22, whereupon the pin 11 on the front end portion of the shaft 9 arrives at the shallowest ends of the grooves 7, limiting additional forward movement of the shaft 9. When this happens, the worm 4 is operationally associated with the operating shaft 9 via the cam 6, the ratchet wheel 5 and the boss 4a of the worm 4, for operation as a unit on further rotation counterclockwise.

During the initial stage of this counterclockwise rotation, the resilient pawl member 19 prevents rotation of the ratchet wheel 5. Additional rotation of the operating shaft 9 counterclockwise overcomes the resistance of the resilient pawl member 19. As the ratchet wheel 5 is thus caused to rotate, the resilient pawl member 19 is compressed and shifted to the position shown in FIG. 6(*a*) where the pawl member 19 prevents the ratchet wheel 5 from rotating clockwise. Thus, as the ratchet wheel 5 is then able to rotate counterclockwise, this rotation is transmitted to the worm 4 via the boss 4a to cause the worm 4 to rotate counterclockwise too and this rotation of the worm 4 is transmitted to the worm wheel 3 to thereby cause the worm wheel 3 and the chain wheel 2 to rotate counterclockwise at a reduced rate. As the chain wheel 2 is rotated counterclockwise, the chain 26 is lowered, and the hanger plate 21 moves down to lower the wheel for subsequent disposal.

Although the preferred embodiment of this invention as hereinabove described is provided with a chain 26 to raise and lower a spare wheel, it will be readily understood that any other appropriate means, such as a rope, may equally be employed for the same purpose, and in case a rope, for example, is used, a drum may be provided to replace the chain wheel 2.

Figure 8:
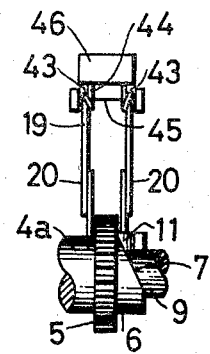
FIG. 8 is a side elevational view of the resilient pawl member shown in FIG. 7.
Figure 9:
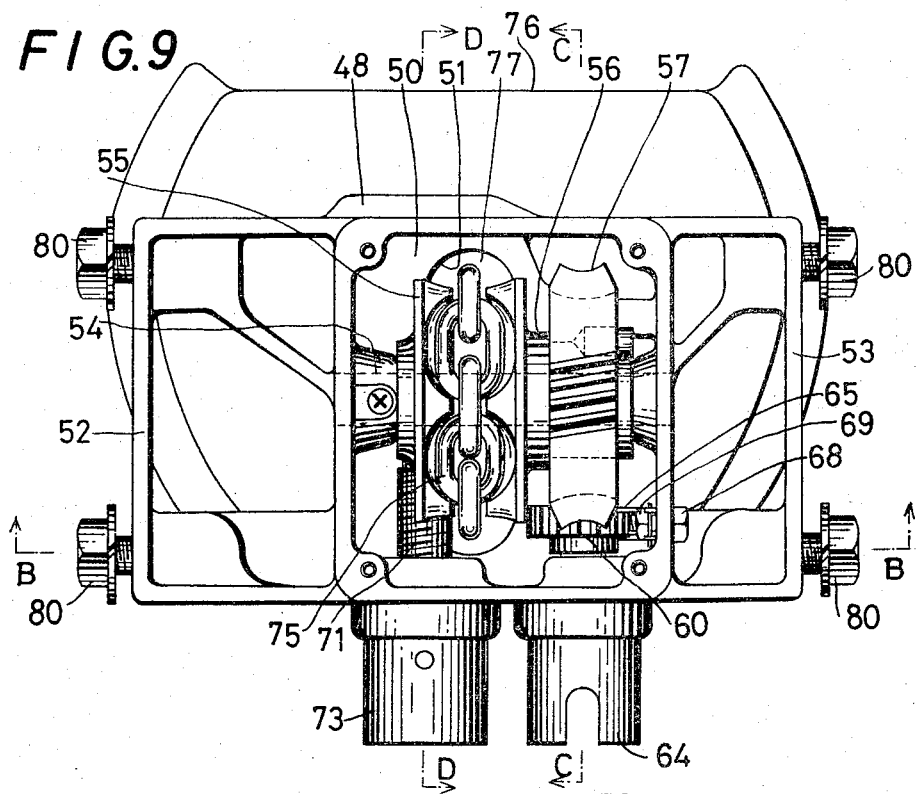
FIG. 9 is a plan view of another embodiment of this invention with the top omitted for clarity.

Reference is now made to FIGS. 7 and 8 to describe a resilient pawl member 19 which is a modified form of the pawl member 19 hereinbefore described with reference to FIG. 6, and is rotatably supported relative to one side wall of the casing 1 instead of being secured thereto. The modified pawl member 19 is formed with a small round loop 43 adjacent to each of the upper ends thereof as best shown in FIG. 7, and rotatably supported on a suitable support member provided on the inner surface of the side wall of the casing 1. This support member includes a pin 45 positioned parallel to the side wall of the casing 1, and the small loops 43 of the pawl member encircle the pin 45. The pawl member has a pair of tab portions 44 which extend upward from the loops 43 and are quite short compared with the rest of the member depending from the loops 43. An inverted L-shaped stop member 46 is mounted on the inner surface of the side wall of the casing 1 in a position slightly above the pin 45 to receive the tab portions 44 of the pawl member between its vertical portion and the casing wall to restrict movement of the upper end portions 44 of the pawl member to thereby restrict rotation of the pawl member.

Shown by broken lines in FIG. 7 is a modified form of the means for restricting rotation of the pawl member 19, which is a rectangular hole 47 cut through the side wall of the casing 1 adjacent to the pin 45. The upper end portions 44 of the pawl member 19 are received on the hole 47, and restricted in movement between the upper and the lower edges of the hole 47. The hole 47 is sized to limit movement of the upper end portions 44 of the pawl member to permit the pawl member to rotate about the pine 45 without being disengaged from the ratchet wheel 5. It will be noted that any other substitute means may be provided on the casing 1 to restrict rotation of the pawl member while ensuring maintenance of the engagement of the pawl member with the ratchet wheel 5.

The device of this invention, which has hereinabove been described in preferred form, has the following principal features and advantages:

Since the resilient pawl member is engaged with the ratchet wheel in such a position as to prevent rotation of the chain wheel operationally associated with the ratchet wheel in the direction which causes releasing of the chain from which a spare wheel is suspended, there is virtually no likelihood that the chain will be released due to vibration of the motor vehicle.

Should the chain wheel accidently rotate in the reverse direction, the spare wheel will not fall, but it is held safely in position by locking engagement between the lever and the groove of the vertical support member which maintain the horizontal hanger plate in a raised position holding the spare wheel firmly against the bottom of the casing.

Simple rotation of the operating shaft in the forward direction permits both the lifting of the spare wheel and the engagement of the lever in the peripheral groove of the wheel support member to hold the spare wheel in position when the spare wheel is raised to its highest position beneath the casing. Likewise, simple rotation of the operating shaft in the reverse direction causes both the disengagement of the lever from the peripheral groove of the wheel support member to make the spare wheel capable of being lowered and the lowering of the spare wheel. Thus, rotation of the operating shaft in the appropriate direction is all that is required to raise the spare wheel and hold it in the raised position or release locking of the spare wheel to its raised position and lower it.

Another embodiment of this invention will hereinafter be described with reference to FIGS. 9 through 13 of the drawings. The device according to this particular embodiment of the invention comprises a casing 48 across which a shaft 54 is horizontally provided and connected to the opposite side walls of the casing 48. A chain wheel 55 is rotatably supported on the shaft 54. A worm gear 57 is connected to a boss 56 provided on the right-hand (as viewed in, for example, FIG. 9) end surface of the chain wheel 55. The worm gear 57 is coaxial with the chain wheel 55 and its boss 56, and rotatable about the shaft 54. A worm 58 engaging with the worm gear 57 is tightly fitted around a driving shaft 61 below the shaft 54 and at right angles thereto, and is rotatable with the driving shaft 61. A web-like portion 49 is formed in the rear right-hand (FIG. 13) corner of the casing 48, and is protuberant from the right-hand side wall and the bottom wall of the casing 48. The inner end of the web-like portion 49 is expanded to form a thicker bottom wall portion 50 leading to the rear left-hand corner of the casing 48.

The bottom right-hand corner of the front wall of the casing 48 has a hole 62 in which the outer end portion of the driving shaft 61 is rotatably supported. The web-like portion 49 has a hole 63 which is horizontally aligned with the hole 62 of the front wall, and the two holes support and position the driving shaft 61. A boss 59 is provided on the front end surface of the worm 58 coaxially therewith. A ratchet wheel 60, which is at one end of and coaxial with the boss 59, and rotates with it. The outer end of the driving shaft 61 extends from the hole 62 of the front wall of the casing 48, and a member 64 for receiving a handle is positioned on the outer end of the driving shaft 61.

Figure 10:
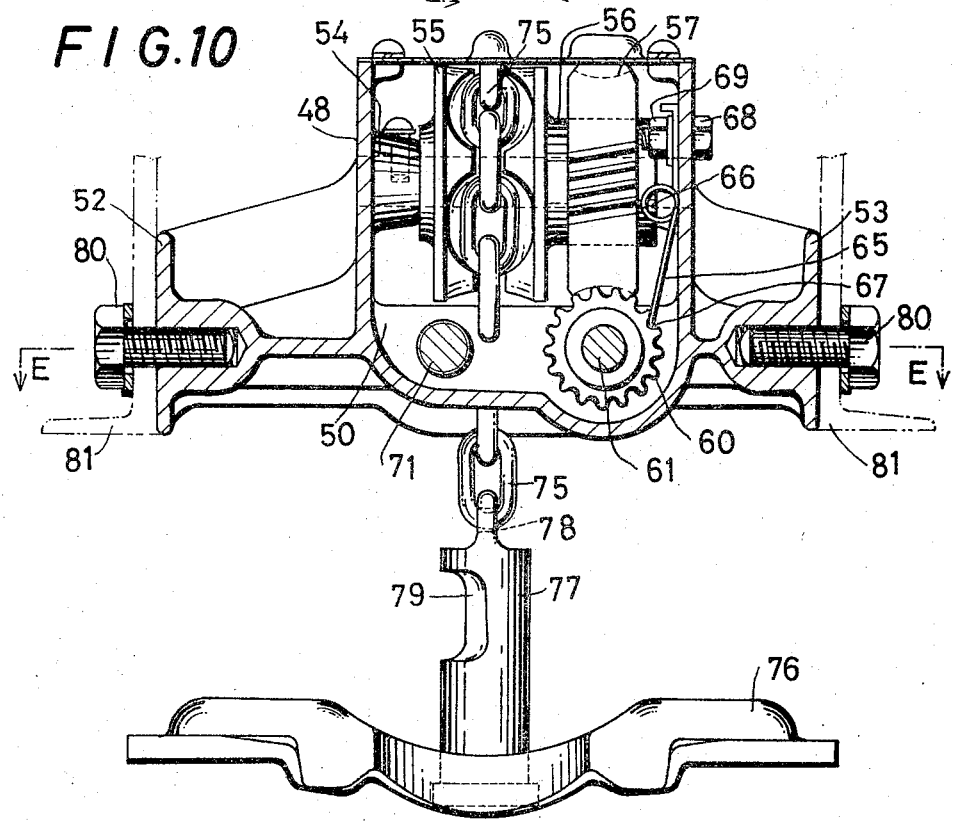
FIG. 10 is a vertical cross-sectional view taken along the line B—B of FIG. 9.
Figure 13:
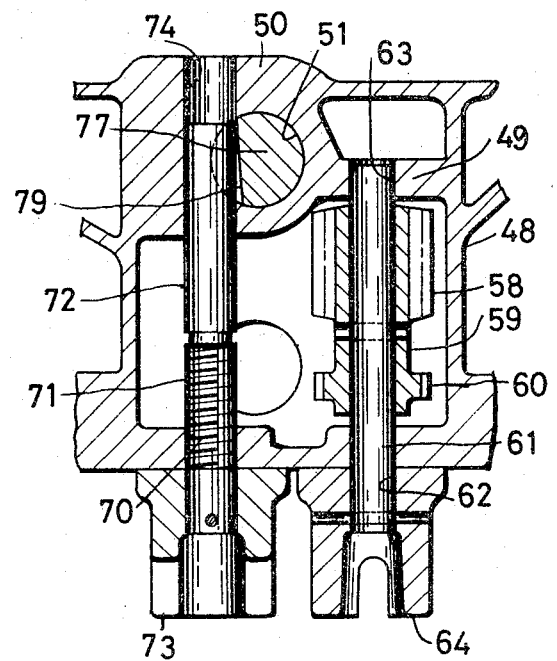
FIG. 13 is a partial cross-sectional view taken along the line E—E of FIG. 10.

As shown in FIG. 10, a generally U-shaped resilient pawl member 65, which is preferably made of spring steel wire, is secured at its upper ends to the right-hand side wall of the casing 48 by a bolt 68 and a nut 69 as shown in FIG. 10. The pawl member 65 is dependent substantially along the inner surface of the right-hand side wall of the casing 48, and its U-shaped lower end 67 is resiliently engaged with the peripheral edge of the ratchet wheel 60. A loop 66 is formed in each of the two parallel portions of the pawl member 65 intermediate the upper and lower ends thereof. A tapped hole 70 is formed through the front wall of the casing 48 near the bottom left-hand corner thereof as shown in FIG. 13. A threaded operating shaft 71 is positioned through the tapped hole 70. The inner end of the operating shaft 71 is integrally connected to the inner end of a cylindrical stopper rod 72. One end of the stopper rod 72 is slidably supported in a hole 74 formed coaxially with the stopper rod 72 through the thicker bottom wall portion 50 of the casing 48. The thicker bottom wall portion 50 of the casing 48 is also provided with a round vertical hole 51, and the hole 74 partly intersects the hole 51 as shown in FIG. 13. One end of the operating shaft 71 extends from the tapped hole 70, and has a firmly secured member 73 for engaging a handle.

A chain 75 is secured at one end to the bottom of the casing 48, and the other end of the chain 75 is suspended from the casing 48 after passing around the chain wheel 55 and through the vertical hole 51. The end of the chain 75 hanging down through the hole 51 of the casing 48 is connected to a substantially cylindrical hanger support member 77 which includes an uppermost ring or eyelet 78 with which the lower end of the chain 75 is connected. The hanger support member 77 further includes a relatively large groove or notch 79 having a downwardly facing shoulder somewhat below the ring 78, and a suitably shaped spare wheel hanger plate 76 is connected to the lower end of the hanger support member 77. A pair of frames 52 and 53 integrally formed with the opposite side walls of the casing 48, respectively, mounts the device on a motor vehicle.

Each of the mounting frames 52 and 53 is provided with a pair of bolts 80 at its outer end to secure the device to a mounting frame provided on the underside of the chassis of the motor vehicle.

The device is secured to the mounting frame 81 by means of the bolts 80. A spare wheel is mounted on the hanger plate 76, and a handle is attached to the member 64 at the outer end of the driving shaft 61. The handle is rotated clockwise to rotate the driving shaft 61, which in turn cause the chain wheel 55 to rotate clockwise at a reduced rate via the worm 58 and the worm wheel 57, whereby the chain 75 is raised. During the initial stage of rotation of the driving shaft 61, the resilient pawl member 65 is in engagement with the ratchet wheel 60 from rotating clockwise, but as hereinbefore explained in connection with the first preferred embodiment of this invention, rotation of the driving shaft 61 causes the ratchet wheel 60 to rotate, and with rotation of the ratchet wheel 60, the lower end 67 of the resilient pawl member 65 engaging with the ratchet wheel 60 is moved by the ratchet wheel 60 until the pawl member 65 eventually engages with the wheel 60 in such a position as to prevent the latter from rotating counterclockwise. As the driving shaft 61 is rotated, the chain 75 is hauled up until the hanger support member 77 is moved into the hole 51 in the bottom wall of the casing 48 and the spare wheel on the hanger plate 76 abuts against the mounting frame 81. The chain 75 can no longer be hauled up, and the notch 79 of the hanger support member 77 moves into the hole 51 adjacent to the hole 74 as shown in FIG. 12.

Figure 12:
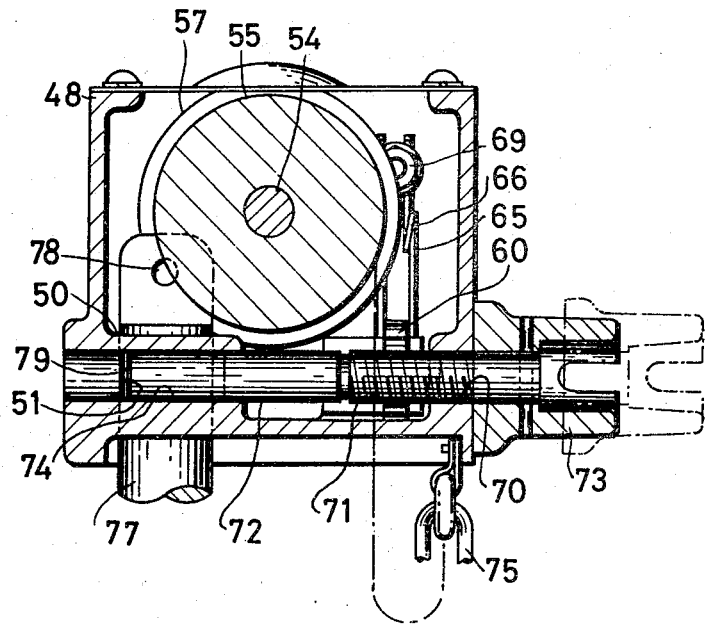
FIG. 12 is a partial cross-sectional view taken along the line D—D of FIG. 9 showing how the stopper rod cooperates with the wheel support member.
Figure 11:
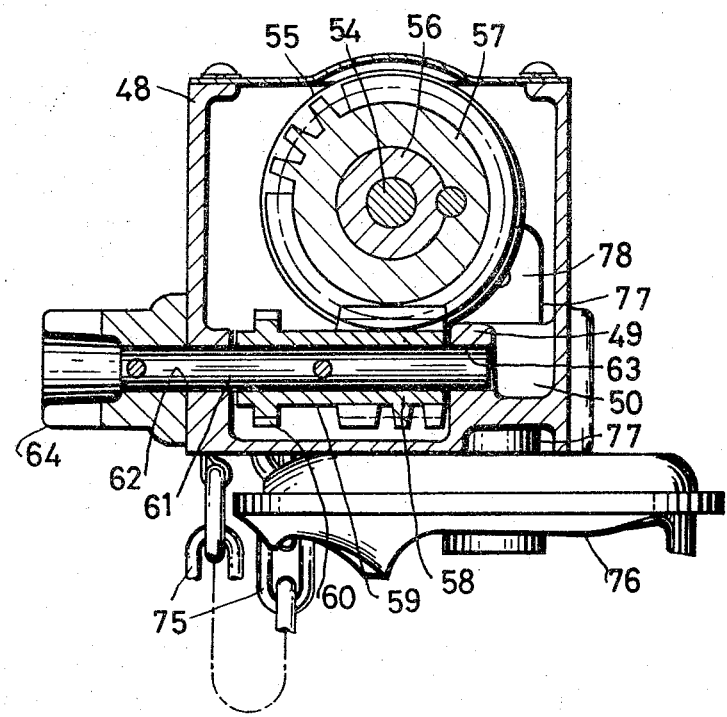
FIG. 11 is a cross-sectional view taken along the line C—C of FIG. 9.

The handle is detached from the member 64 on the driving shaft 61, and attached to the member 73 at the outer end of the stopper rod operating shaft 71 in the position shown by chain-and-dot lines in FIG. 12. The handle is then rotated clockwise to rotate the stopper rod operating shaft 71 and move it into the casing 48 through the tapped hole 70. With the rotation of the operating shaft 71, the stopper rod 72 integrally formed with it is also rotated and advanced through the hole 74. As the stopper rod 72 is advanced through the hole 74, it is moved into the hole 51 corssing the hole 74, and the notch 79 of the hanger support member 77 in the hole 51. When the operating shaft 71 and the stopper rod 72 are advanced to their innermost position shown by solid lines in FIG. 12, the handle fitting member 73 abuts against the front wall of the casing 48, so that the stopper rod 72 can no longer be moved forward, and is locked in the notch 79 of the hanger support member 77 to hold the spare wheel in position between the hanger plate 76 and the mounting frame 81.

In order to lower the spare wheel, the operating shaft 71 for the stopper rod 72 is rotated in the reverse direction, and brought back to its outermost position shown by the chain-and-dot lines in FIG. 12 to disengage the stopper rod 72 from the groove 79 of the hanger support member 77. Then, the driving shaft 61 is rotated in the reverse direction to switch over the resilient pawl member 65 to such a position as to prevent the ratchet wheel 60 from rotating clockwise. The driving shaft 61 continues to be rotated counterclockwise to release the chain 75 from the chain wheel 55 until the spare wheel is lowered onto the ground.

The device according to the second preferred embodiment of this invention as hereinabove described includes a stopper rod operating shaft provided independently of a chain driving shaft, a spare wheel lifted by rotating the chain driving shaft can be positively and safely held in position relative to a motor vehicle simply by rotating the stopper rod operating shaft, whereby the stopper rod connected with the operating shaft therefor is brought into engagement with a groove formed in a hanger support member for the spare wheel.

It will be understood that though the foregoing two embodiments have both been described as including a worm gear to transmit the force for dirving the chain, any other unreversible reduction gear means may be sutstituted for the worm wheel. It will also be noted that the hanger support member may be provided with a hole, notch, groove or shoulder as hereinabefore described, with which the lever or stopper rod may be engaged to hold the hanger support member carrying a spare wheel in its raised position.

With regard to operation, the drum and chain, as shown, co-act to maintain non-slip engagement. A fiber rope, woven rope, or metal rope can be used on provision of a drum which maintains a similar non-slip engagement with the rope. By way of example, a pinch roller can be added to force the chain or rope against the drum. Once a portion of rope or chain has passed over the drum, it can drop out of the casing through a hole aligned with the edge of the drum. This will enable the present invention to lift a tire on a rope or chain of indefinite length, although the length is usually short for practical purposes.

The rope or chain can be collected in the casing if desired but this normally requires more room in the casing. This expansion of the casing is normally deemed undesirable because it increases the cost of the invention.

The tire support member which is on the elongate flexible member can either bolt to the spare tire by using the lug holes or it can be positioned below the tire and pass through the central opening of the tire.

The foregoing is directed to two alternative embodiments but the scope hereof is determined by the claims which are as follows:

What is claimed is:

1. Apparatus for holding a spare wheel on a motor vehicle, comprising:
   a casing adapted to be secured to the underside of the chassis of a motor vehicle;
   a winch mechanism supported by said casing and including a bidirectionally rotating means;
   an elongate flexible member passed at least partly around said rotating means and having one end adapted to be raised upon rotation of said rotating means in one direction, while being lowered upon rotation of said rotating means in the opposite direction;
   a wheel support member connected to said one end of said flexible member and adapted to support a spare wheel;
   a lock means supported by said casing;
   a shoulder means formed on said wheel support member; and,
   an actuating means operationally associated with said rotating means for actuating said lock means to cause said lock means to engage said shoulder means to hold said wheel support member in a raised position upon rotation of said rotating means in one direction, while said lock means is caused by said actuating means to disengage from said shoulder means to permit lowering of said wheel support member upon rotation of said rotating means in an opposite direction.

2. The apparatus of claim 1 wherein said winch mechanism includes a drum shaped and contoured to receive a chain made of links therearound.

3. The apparatus of claim 1 wherein said rotating means includes:
   a worm;
   a worm gear engaged with said worm;
   a drum rotated by said gear;
   an operating shaft constructed and arranged for rotation by a user;
   means for selectively communicating rotation in a first direction from said shaft to said worm;
   means selectively rendered operative to limit rotation of said gear to the direction caused by said shaft and said worm; and
   means for selectively defeating operation of said last-named means.

4. The apparatus of claim 1 wherein said lock means comprises a pivotally-mounted lever, a resilient means for urging said lever to a first and locking means, and means connecting to said actuating means for moving said lever to a second and non-locking position.

5. The apparatus of claim 4 wherein said pivotally mounted lever is pivotally moved relative to an opening means in said casing adn the first position locks said shoulder means relative to said opening means.

6. The apparatus of claim 1 wherein said shoulder means is a portion of a notch in said wheel support member.

7. The apparatus of claim 1 wherein said lock means includes a movable rod;
   said actuating means includes a rotatively-actuated means moving said rod between two positions;
   said shoulder means includes a downwardly-facing shoulder on said wheel support member;
   said flexible member extending through an opening means in said casing; and
   said winch mechanism pulling said flexible member through said opening means until said shoulder means is within said casing, and said actuating means moves said movable rod into an interferring position below said shoulder means to prevent subsequent downward movement of said wheel support member.

8. The apparatus of claim 7 wherein said movable rod is received in an opening means which intersects a second opening means and said movable rod and said shoulder means are lockingly received in said first and second opening means.

* * * * *

UNITED STATES PATENT OFFICE
CERTIFICATE OF CORRECTION

Patent No. 3,856,167                     Dated December 24, 1974

Inventor(s) Setsuo Yasue et al.

It is certified that error appears in the above-identified patent and that said Letters Patent are hereby corrected as shown below:

In item [73] should read: -- Assignee: Sanko Kiki Kabushiki Kaisha, Nagoya, Japan --

Signed and sealed this 1st day of July 1975.

(SEAL)
Attest:

RUTH C. MASON
Attesting Officer

C. MARSHALL DANN
Commissioner of Patents
and Trademarks